United States Patent [19]

Houghton, Jr.

[11] Patent Number: 5,071,108

[45] Date of Patent: Dec. 10, 1991

[54] PNEUMATIC VIBRATION ISOLATION SYSTEMS WITH AUTOMATIC PISTON CENTERING

[75] Inventor: Worthington B. Houghton, Jr., Newport Beach, Calif.

[73] Assignee: Newport Corporation, Fountain Valley, Calif.

[21] Appl. No.: 464,445

[22] Filed: Jan. 12, 1990

[51] Int. Cl.⁵ ............................................. F16F 9/04
[52] U.S. Cl. ..................................... 267/136; 267/150
[58] Field of Search ............... 267/64.15, 64.24, 64.27, 267/75, 113, 118, 121, 122, 126, 136, 150, 140.1, 124; 248/562, 566, 516, 636, 638

[56] References Cited

U.S. PATENT DOCUMENTS

| | | | |
|---|---|---|---|
| 3,730,473 | 5/1973 | Pepi | 267/122 X |
| 3,784,146 | 1/1974 | Matthews | 248/562 |
| 3,989,232 | 11/1976 | Sleinbach et al. | 267/122 X |

FOREIGN PATENT DOCUMENTS

| | | | |
|---|---|---|---|
| 214754 | 3/1987 | European Pat. Off. | 267/136 |
| 2344570 | 4/1974 | Fed. Rep. of Germany | 267/118 |
| 26334 | 1/1990 | Japan | 267/136 |
| 430340 | 8/1967 | Switzerland | 248/562 |

OTHER PUBLICATIONS

Visolator Vibration Isolation Breedboard, (Photographs), Pre Jan. 1990.
"Design of Laminar Flow Restrictors for Damping Pneumatic Vibration Isolators", Daniel B. DeBra, CIRP 34th General Assembly, (Aug. 1984).
Newport Catalog (Newport Corporation, 1989).

Primary Examiner—Robert J. Oberleitner
Assistant Examiner—Alfred Muratori
Attorney, Agent, or Firm—Benoit Law Corporation

[57] ABSTRACT

A pneumatic vibration isolation system, wherein an operating piston is displaced by vibrations relative to a chamber containing compressed gas, and automatically centers that operating piston for each inflation of the chamber with compressed gas. The isolation system may have a contoured centering guide for that piston.

13 Claims, 2 Drawing Sheets

PNEUMATIC VIBRATION ISOLATION SYSTEMS WITH AUTOMATIC PISTON CENTERING

BACKGROUND OF THE INVENTION

Field of the Invention

The subject invention relates to isolation of loads and other objects from vibration and to pneumatic vibration isolation systems.

Information Disclosure Statement

A modern pneumatic vibration isolation system is disclosed in the NEWPORT CATALOG (Newport Corporation, 1989), pp. A-2 to A-33. Reference may also be had to U.S. Pat. No. 3,784,146, by John W. Matthews, Ph.D., issued Jan. 8, 1974, for Horizontal Vibration Isolation System. That patent discloses a horizontal vibration isolation system and also provides for each pneumatic vibration isolator an air housing relative to which the operating piston assembly is displaced by vibrations.

Further information may be obtained from a paper entitled "Design of Laminar Flow Restrictors for Damping Pneumatic Vibration Isolators," presented by Professor Daniel B. DeBra at the CIRP 34th General Assembly, August 1984.

Problems arise particularly if a user fails to follow instructions or otherwise manages to cant a piston. Especially if several vibration isolators are used as legs for an optical table or similar mass, one or more of the operating pistons can become off-centered, which affects the operation of the system and may even cause damage.

SUMMARY OF THE INVENTION

It is a general object of this invention to overcome the disadvantages and to meet the needs expressed or implicit in the above Information Disclosure Statement or in other parts hereof.

It is a germane object of the invention to provide for improved isolation of loads and other objects from vibration.

It is a related object of the invention to provide improved pneumatic vibration isolation systems.

It is also an object of the invention to provide automatic operating piston centering in pneumatic vibration isolation systems.

Other objects of the invention become apparent in the further course of this disclosure.

The invention resides in a pneumatic vibration isolation method wherein an operating piston is displaced by vibrations relative to a chamber containing compressed gas, and, more specifically, resides in the improvement comprising the steps of providing a mechanical stop for said operating piston, providing a centering guide for said operating piston with first and second slanted surfaces having said mechanical stop therebetween and being engageable by said mechanical stop, separating said slanted surfaces from said mechanical stop during vibration isolation by said operating piston, centering said operating piston by engagement of said mechanical stop and first slanted surface during each deflation of said chamber, and automatically centering that operating piston by engagement of said mechanical stop and second slanted surface during inflation of the chamber with compressed gas.

The invention resides also in a pneumatic vibration isolator including a chamber containing compressed gas, and, more specifically, resides in the improvement comprising, in combination, an operating piston displaced by vibrations relative to the chamber, means for automatically centering that operating piston during deflation of the chamber and means for automatically centering said operating piston upon inflation of said chamber with said compressed gas and means for suspending operation of both of said means for automatically centering the operating piston during vibration isolation by the operating piston.

The invention similarly resides in a pneumatic vibration isolator wherein an operating piston is displaced by vibrations relative to a chamber containing compressed gas, and, more specifically, resides in the improvement comprising, in combination with that piston, a stationary mounting plate, a piston centering plate having a slanted conical area, and a contoured centering guide in said stationary mounting plate for that slanted conical area of said piston centering plate.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
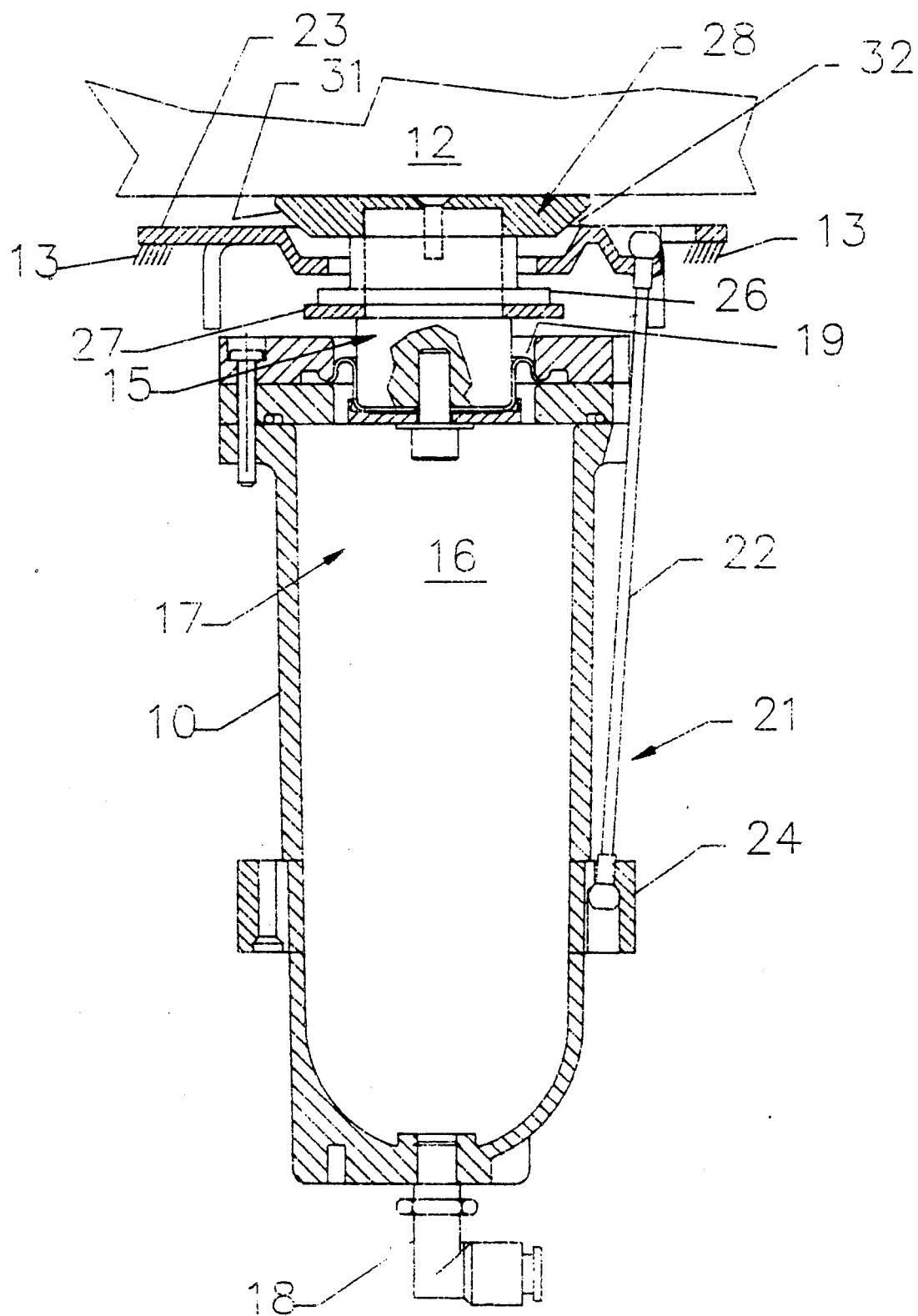
FIG. 1 is a vertical section through a pneumatic vibration isolator according to an embodiment of the subject invention.

The drawings show pneumatic vibration isolators 10 which may, for instance, be employed to isolate a load, mass, machinery or table 12 from vibrations of a floor, ground or other reference shown by slanted lines 13, or to isolate such floor ground or other reference 13 from vibrations of machinery. A table typically would have three or more of such vibration isolators as legs for this purpose. The slanted lines 13 may, for instance, be symbolic of a hollow table leg standing on a floor (not shown).

The vibration isolators 10 are of a type wherein an operating piston 15 is displaced by vibrations relative to compliance chamber 16 containing compressed gas 17 of a volume predetermined in terms of natural vibration isolation frequency. For a determination of a suitable gas volume reference may be had to equation (1) and its accompanying text on page 2 of the above mentioned CIRP Paper and to the tutorial on pages 2-A et seq. of the NEWPORT CATALOG.

An external damping chamber or external damping chamber volume (not shown) may be connected to the compliance chamber, such as by a fitting 18. On the other hand, a permeable pressure barrier (not shown) can be used in the compliance chamber 16, and damping can then be effected by displacing gas with the operating piston through that pressure barrier in that compliance chamber, providing an integrated damping control, as disclosed in copending patent application Ser. No. 07/464,246 filed Jan. 12, 1990, for Pneumatic Vibration Isolation Systems, by Richard Paul Eddy and myself, and assigned to the common assignee hereof.

However, piston centering system according to the subject invention may also be applied to such damping systems as shown or described in the above mentioned Patent 3,784,146, in the cited NEWPORT CATALOG, or in the above mentioned CIRP Paper.

As in state-of-the-art equipment, the piston 15 may be sealed relative to the compliance chamber 16 by a diaphragm seal 19.

The piston 15 may be fitted with a pendulum isolation system to isolate horizontal components of vibration. Such a pendulum isolation system is shown in the above mentioned U.S. Pat. No. 3,784,146, and in NEWPORT CATALOG, pp. A-5 and A-22. The drawings, on the other hand, show a pendulum isolation 21 which has three cables 22, one of which is visible in FIG. 1. These cables extend between the mounting plate 23 and a mounting ring 24 to suspend the compliance chamber for horizontal vibration isolation.

A bumper of rubber or of an elastomer extends through an aperture in the mounting plate 23 between a plate 27 on the piston 15 and a plate 28 supporting the load 12.

As illustrated in the drawings, the subject invention automatically centers the operating piston 15 prior to each inflation of the compliance chamber with compressed gas 17 or during deflation of that compliance chamber, such as through the port 24 or fitting 18. Means for effecting such automatic centering may comprise a contoured centering guide on the operating piston 15 or piston plate 27, plate 23 and/or plate 28.

According to the preferred embodiment illustrated in FIG. 1, the plate 28 has a slanted conical area 31, and the mounting plate 23 has a circular edge 32 toward which the slanted conical area descends as the compliance chamber 16 is deflated. During such descent, portions of the slanted area 31 slide along corresponding portions of the edge 32 until the plate 28 is centered relative to the plate 23. In this manner, the operating piston 15 is automatically centered prior to each reinflation of the compliance chamber or actually already during deflation of that compliance chamber 16. Relative horizontal motion may take place between load 12 and plate 28 or 35 during automatic centering.

Figure 2:
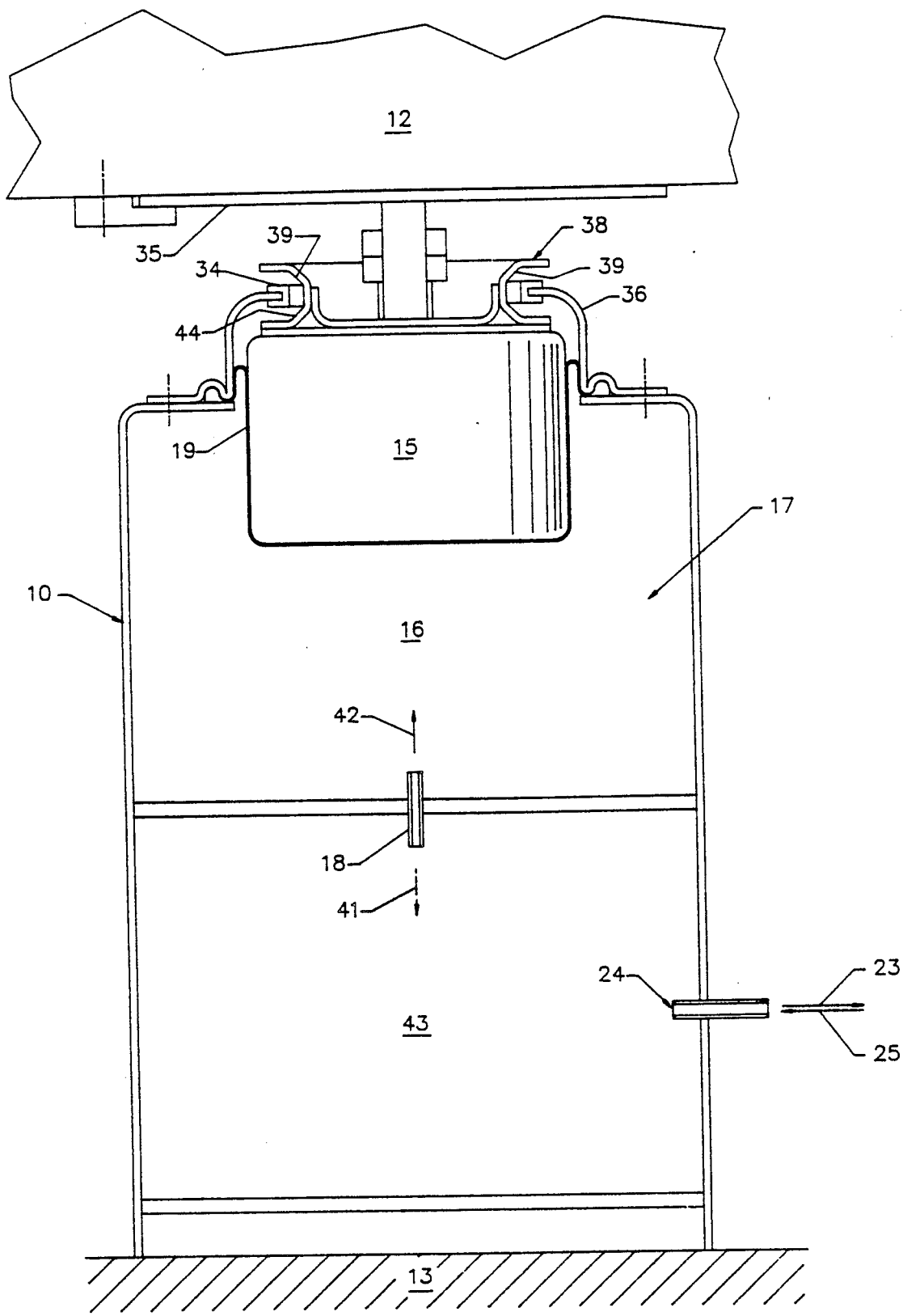
FIG. 2 is a view similar to FIG. 1 showing another embodiment of the subject invention.

According to the embodiment shown in FIG. 2, one or more cushioned mechanical stops 34 may be positioned between a load support plate 35 and the top of the piston to limit the vertical motion of that piston 15. According to the embodiment of FIG. 2, the stop is in the form of a mechanical stop ring 34 which extends around the inner edge of a stop plate 36 at the conically contoured centering guide 38 to limit the vertical and the horizontal motion of the operating piston.

That contoured centering guide has a slanted conical area 39 which contacts the stop 34 or an inner edge of that stop, when the piston 15 settles downwardly as the vibration isolator 10 is deflated or decompressed by letting the compressed gas 17 flow out of the compliance chamber 16, such as through port 18 as indicated by the dotted arrow 41. Portions of this slanted area 39 slide along the inner upper edge or corner of stop 34, much like the conical element 28 shown in FIG. 1, until the deflating piston 15 is centered within the lateral confines of the component 36 and rolling diaphragm 19 or other seal.

Accordingly, if the isolator 10 or compliance chamber is reinflated, such as by compression of gas 17 as indicated by the arrow 42 through the port 18, the piston 15 already is in a centered condition, which prevents faulty operation, especially if three or more isolators 10 are involved as legs of a table or other mass 12.

The contoured centering guide 28 or 38 or other automatic centering within the scope of the subject invention, also enhances the utility of the pendulum suspension 21 or of any other horizontal vibration isolation suspension, inasmuch as such suspension then always starts its operation from a centered condition when the compliance chamber 16 is reinflated or recompressed.

The design of the compliance chamber 16 may be the same in FIGS. 1 and 2, and the same comments apply to FIG. 2 as to FIG. 1 also with respect to the NEWPORT CATALOG, U.S. Pat. No. 3,784,146, and the above mentioned copending patent application. In that respect, FIG. 2 also shows the conventional damping reservoir or chamber 43 into which the gas 17 is issued through the port 24 as illustrated by the dotted arrow 25 or from which it is removed as indicated by the arrow 23. The port 18 may be a flow restrictor in that case.

The contoured centering guide 38 shown in FIG. 2 also has a further feature according to an embodiment of the invention which may be implemented also in FIG. 1, and which even may be used independently of the feature pertaining to the slanted areas 31 and 39.

In particular, the contoured centering guide 38 has a second slanted conical area 44 which contacts the stop 34 or the inner lower edge of that stop, when the piston 15 is pushed upwardly by inflation of the isolator 10 through gas 17 compressed into the compliance chamber 16, such as through port 18 as indicated by the solid arrow 42. In practice, many users of optical tables or similar masses 12 first fully inflate the vibration isolator and then put the table or other mass 12 onto the isolator or load support plate 35. In that case, the lower slanted area 44 of the centering guide automatically centers the piston on its way up, as seen from the compliance chamber 16.

In particular, portions of this slanted area 44 slide along the inner lower edge or corner of stop 34, until the rising piston 15 is centered within the lateral confines of the component 36 and rolling diaphragm 19 or other seal.

Accordingly, if the isolator 10 then is made ready for operation, such as by a certain deflation of the compressed gas 17 from the chamber 16, the piston 15 already is in a centered condition, which prevents faulty operation, especially if three or more isolators 10 are involved as legs of a table or other mass 12.

It may now be realized that the subject invention resides in pneumatic vibration isolation methods and apparatus wherein an operating piston 15 is displaced by vibrations relative to a chamber 16 containing compressed gas 17. The invention in that combination resides in automatically centering the operating piston 15 for each inflation of the chamber 16 with compressed gas 17. According to the embodiment shown in FIG. 1 and in the upper portion of FIG. 2 at 39, the operating piston 15 is automatically centered prior to each inflation of the chamber 17 with compressed gas. With the scope of that embodiment, the operating piston is automatically centered while deflating the chamber, as described above.

On the other hand, according to another embodiment of the invention, the operating piston 15 is automatically centered upon inflation of the chamber 16 with compressed gas 17, such as described above with reference to the lower slanted surface 44 shown in FIG. 2. The two embodiments may be combined, such as shown at 39 and 44 in FIG. 2.

In the drawings, the operating piston 15 is displaced vertically by vibrations. In that case, the operating piston 15 may automatically be centered with respect to a vertical axis, such as at 31/32 in FIG. 1 and/or 39/44 in FIG. 2, during deflation or upon inflation of the chamber 16.

The illustrated embodiments provide a centering guide 28 or 38 for the operating piston and mechanically actuate such centering guide to center that operating piston 15, such as with the edge 32 shown in FIG. 1 or the upper and/or lower inner edge or edges of the stop 34 shown in FIG. 2, which may exert horizontal forces on the operating piston, such as via slanted areas 31, 39 and/or 44. Other embodiments within the scope of the invention place the slanted guide areas on the fixed portion of the isolator assembly and the guided edges on the moving piston.

According to the illustrated embodiments of the invention, a mechanical stop is provided for the operating piston, such as at 23 and 32 in FIG. 1 or at 34 in FIG. 2. A centering guide for the operating piston has a slanted surface engageable by such mechanical stop, such as at 31 in FIG. 1 or at 39 and/or 44 in FIG. 2. Such slanted surface is separated from the mechanical stop during vibration isolation by said operating piston 15, such as seen in FIG. 1 and in FIG. 2. The operating piston is centered by engagement of the mechanical stop and slanted surface for each inflation of the chamber 16. This may, for instance, be prior to each inflation, as in FIG. 1 and FIG. 2 at 39, or upon each inflation, as in FIG. 2 at 44.

In apparatus terms, the pneumatic vibration isolator 10 includes a chamber 16 containing compressed gas 17. This aspect of the invention resides in the improvement comprising, in combination, an operating piston displaced by vibrations relative to the chamber 16 and a guide 28 or 38 or other means for automatically centering that operating piston 15 for each inflation of the compliance chamber with the compressed gas 17. According to such embodiments as shown in FIG. 1 and at 39 in FIG. 2, this may include means for automatically centering the operating piston 15 prior to each inflation of the chamber 16 with compressed gas, or for automatically centering the operating piston during deflation of the chamber 16.

Alternatively or additionally, means for automatically centering the operating piston may, for instance, include the slanted surface 44 in FIG. 2 for centering the piston 15 upon inflation of the chamber 16 with compressed gas.

The means for automatically centering the operating piston 16 may include a mechanical stop 32 or 34. As seen in FIG. 2 showing the operating piston 15 in its vibration isolation position, the contoured centering guide 38 acts as a means for suspending operation of both of the automatic operation piston centering means 39 and 44 during vibration isolation by the operating piston.

The subject extensive disclosure will render apparent or suggest to those skilled in the art various modifications and variations within the spirit and scope of the subject invention and equivalents thereof.

I claim:

1. In a pneumatic vibration isolation method wherein an operating piston is displaced by vibrations relative to a chamber containing compressed gas, the improvement comprising the steps of:
   providing a mechanical stop for said operating piston;
   providing a centering guide for said operating piston with first and second slanted surfaces having said mechanical stop therebetween and being engageable by said mechanical stop;
   separating said slanted surfaces from said mechanical stop during vibration isolation by said operating piston;
   centering said operating piston by engagement of said mechanical stop and said first slanted surface during each deflation of said chamber; and
   automatically centering said operating piston by engagement of said mechanical stop and said second slanted surface during inflation of said chamber with compressed gas.

2. A method as in claim 1, wherein:
   said operating piston is automatically centered prior to each inflation of said chamber with compressed gas.

3. A method as in claim 1, wherein said centering includes the steps of:
   deflating said chamber; and
   automatically centering said operating piston while deflating said chamber.

4. A method as in claim 1, wherein:
   said operating piston is automatically centered upon inflation of said chamber with compressed gas.

5. A method as in claim 1, wherein:
   said operating piston is displaced by vertical vibrations; and
   said operating piston is automatically centered with respect to a vertical axis.

6. A method as in claim 1, including:
   providing said centering guide for said operating piston as a conically contoured centering guide having said first and second slanted surfaces to center said operating piston.

7. A method as in claim 1, wherein:
   said operating piston is displaced by vertical vibrations; and
   said operating piston is automatically centered by exertion of horizontal forces on said operating piston.

8. A method as in claim 1, wherein:
   said mechanical stop for said operating piston is provided as a mechanical stop ring.

9. In a pneumatic vibration isolator including a chamber containing compressed gas, the improvement comprising in combination:
   an operating piston displaced by vibrations relative to said chamber;
   means for automatically centering said operating piston during deflation of said chamber; and
   means for automatically centering said operating piston upon inflation of said chamber with compressed gas; and
   means for suspending operation of both of said means for automatically centering said operating piston during vibration isolation by said operating piston.

10. An isolator as in claim 9, wherein:
    said means for automatically centering said operating piston during deflation of said chamber include a slanted conical area.

11. An isolator as in claim 9, wherein:

said means for automatically centering said operating piston during deflation of said chamber include a first slanted conical area.

12. An isolator as in claim 11, wherein:
said means for automatically centering said operating piston upon inflation of said chamber with compressed gas include a second slanted conical area.

13. An isolator as in claim 12, including:
a mechanical stop for said operating piston between said first and second slanted conical areas.

* * * * *